Aug. 10, 1954  W. UPTON  2,686,077
SUN VISOR AND ADJUSTABLE PIVOTED SHIELD
Filed Aug. 24, 1951
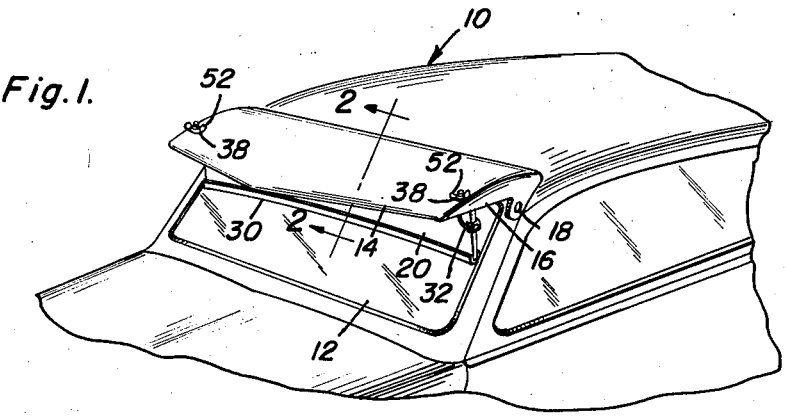
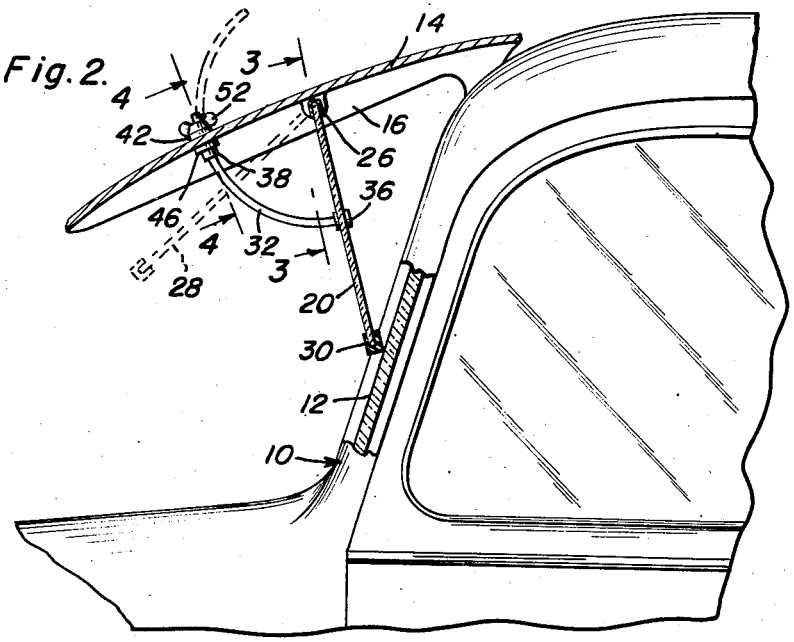
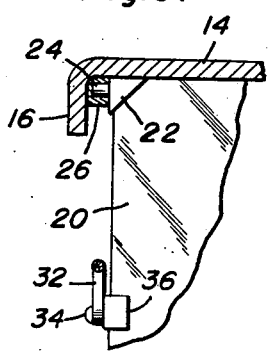
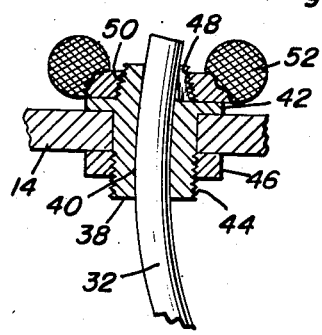
Walter Upton
INVENTOR.

Patented Aug. 10, 1954

UNITED STATES PATENT OFFICE 2,686,077

2,686,077

SUN VISOR AND ADJUSTABLE PIVOTED SHIELD

Walter Upton, Kansas City, Kans.

Application August 24, 1951, Serial No. 243,521

1 Claim. (Cl. 296—95)

This invention relates to new and useful improvements and structural refinements in windshield protecting devices for automobiles and similar vehicles, and the principal object of the invention is to provide an adjustable shield which may be conveniently and expeditiously attached to a conventional sun visor, so as to protect an upper portion of the windshield from rain, sleet, snow, ice, or the like, whereby to substantially reduce the hazards of driving.

In particular, the invention contemplates the provision of a shield which is swingably attached to the underside of a sun visor and which may be so adjusted that the lower edge of the shield contacts the windshield.

Some of the advantages of the invention reside in its simplicity of construction, in its convenient adjustability, and in its adaptability for use in association with sun visors and vehicle windshields of different types.

With the above more important objects and features in view and such other objects and features as will become apparent as the specification proceeds, the invention consists essentially of the arrangement and construction of parts as illustrated in the accompanying drawings, in which:

Figure 1 is a perspective view illustrating a portion of a vehicle, a sun visor and a shield constructed in accordance with the invention attached to the sun visor;

Figure 2 is a fragmentary sectional view, taken substantially in the plane of the line 2—2 in Figure 1;

Figure 3 is a fragmentary sectional view, taken substantially in the plane of the line 3—3 in Figure 2, and Figure 4 is a fragmentary sectional detail, taken substantially in the plane of the line 4—4 in Figure 2.

Like characters of reference are employed to designate like parts in the specification and throughout the several views.

Referring now to the accompanying drawings in detail, the general reference character 10 designates a vehicle body having a windshield 12 and a conventional sun visor 14 provided at the opposite ends thereof with depending flanges 16 for attachment to the vehicle body as at 18, as will be clearly apparent.

The invention resides in the provision of a visor panel or shield 20 of transparent material, this panel being provided at its upper edge with a pair of triangular corner brackets 22 equipped with trunnions 24 which are rotatable in suitable bearings 26 mounted on the inner surfaces of the sun visor flanges 16, as is best shown in Figure 3. By virtue of this arrangement the visor panel or shield 20 may be swung from the position shown by full lines in Figure 2 to a position shown by the dotted lines 28, that is, toward and away from the windshield 12, as desired. It may be mentioned at this point that the transparent panel 20 may be tinted in color, so as to reduce glare in addition to its protectiveness for the upper portion of the windshield 12. The lower edge of the panel 20 is provided with a resilient, channel-shaped gasket or bumper 30 which engages the windshield 12 when the panel 20 is swung rearwardly, and means are also provided for sustaining the panel 20 in any desired adjusted position.

These means involve the provision of a pair of arcuate rods 32 which are pivoted as at 34 to a pair of brackets 36 secured to the opposite side edges of the panel 20, each of the rods 32 being slidable in a split clamping sleeve 38 mounted in the sun visor 14. The rod 32 lies in an arcuate bore 40 provided in the sleeve 38 and this bore, together with the rod 32, are concentric in curvature with the trunnions 24, so as to prevent any binding action when the panel 20 is swung.

Each of the sleeves 38 is equipped with an enlarged head 42 and with a screw threaded portion 44 to receive a nut 46 whereby the sleeve may be secured to the sun visor, the upper end portion of the sleeve 38 being split as at 48 and provided with a tapered thread 50 to receive a tapered clamping nut 52, so that when the two nuts 52 are tightened, sliding of the rods 32 in the sleeves 38 is prevented and the visor panel 40 is sustained in any desired, adjusted position relative to the windshield 12.

It is believed that the advantages and use of the invention will be clearly understood from the foregoing disclosure and accordingly, further description at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

The combination of a sun visor, a visor panel atached to said sun visor for swinging adjustment about an axis on the sun visor extending along its length, a sleeve provided on the sun visor at one side of the axis of swinging of said panel, said sleeve having an arcuate bore concentric with the stated axis, an arcuate rod slidable in said bore and connected at one end thereof to said panel, one end portion of said sleeve being split and provided with a tapered external thread, and a tapered locking nut positioned on the threaded portion of the sleeve for urging the same into a frictional clamping engagement with said rod.

References Cited in the file of this patent

UNITED STATES PATENTS

| Number | Name | Date |
|---|---|---|
| 1,204,122 | Bowman | Nov. 7, 1916 |
| 1,401,382 | Whitish | Dec. 27, 1921 |
| 1,532,791 | Wille | Apr. 7, 1925 |
| 1,556,902 | Beville et al. | Oct. 13, 1925 |
| 1,565,381 | Martin | Dec. 15, 1925 |
| 1,640,088 | Megown | Aug. 23, 1927 |